UNITED STATES PATENT OFFICE 2,312,704

REACTION PRODUCT OF ALDEHYDES AND TRIAZINE DERIVATIVES

Gaetano F. D'Alelio, Pittsfield, Mass., assignor to General Electric Company, a corporation of New York No Drawing. Application January 28, 1942, Serial No. 428,585

20 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a triazine derivative corresponding to the following general formula:

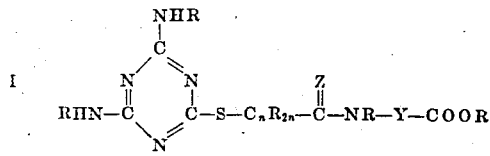

In the above formula $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and substituted hydrocarbon radicals, more particularly halo-hydrocarbon radicals. Since $n$ represents an integer which is 1 or 2, it will be seen that the linkage of the carbocyclic-carbamyl-alkyl grouping to the sulfur atom in all cases will be alpha or beta to the carbocyclic-carbamyl or -thiocarbamyl grouping. It also will be observed that linkage of the triazinyl grouping to the sulfur atom is through a carbon atom.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, heptyl, octyl, nonyl, etc.), including cycloaliphatic (e. g., cyclopentyl, cyclopentenyl, cyclohexyl, cyclohexenyl, cycloheptyl, cycloheptenyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertiary-butylphenyl, amylphenyl, isoamylphenyl, etc.); aryl-substituted aliphatic (e. g., benzyl, phenylethyl, phenylpropyl, phenylisopropyl, phenylamyl, cinnamyl, etc.); and their homologues, as well as those groups with one or more of their hydrogen atoms substituted by, for example, a halogen, specifically chlorine, fluorine, bromine or iodine. Specific examples of halogeno-substituted hydrocarbon radicals are chloromethyl, chloroethyl, bromomethyl, bromoethyl, chloropropyl, bromopropyl, iodopropyl, iodoamyl, chlorochloroethyl, bromoethyl, bromoethyl, chloroamyl, bromoamyl, chlorophenyl, bromophenyl, iodophenyl, fluorophenyl, dichlorophenyl, trichlorophenyl, dibromophenyl, tribromophenyl, chlorotolyl, dichlorotolyl, bromotolyl, dibromotolyl, iodotolyl, fluorotolyl, chlorocyclohexyl, chlorocyclohexenyl, ethyl chlorophenyl, ethyl bromophenyl, propyl chlorophenyl, phenyl chloroethyl, chlorohexyl, etc. Preferably R in Formula I is hydrogen. Also especially suitable for use in carrying the present invention into effect are triazine derivatives corresponding to the general formulas

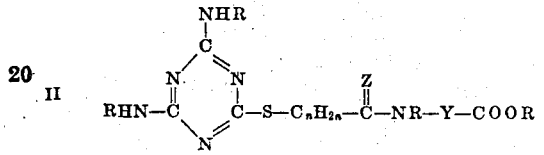

and, more particularly,

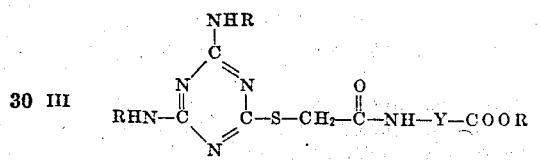

where $n$, Z, Y and R have the same meanings as above given with reference to Formula I.

Illustrative examples of divalent carbocyclic radicals which Y in Formulas I, II and III may represent are: divalent aryl, e. g., phenylene, xenylene, naphthalene, etc.; divalent aliphatic-aryl, e. g., 2,5-toluylene, 1,4-dimethyl 2,3-phenylene, etc.; divalent cycloaliphatic, e. g., cyclopentylene, cyclohexylene, cyclopentenylene, cyclohexenylene, cycloheptylene, etc.; and their homologues, as well as those divalent carbocyclic radicals with one or more of their hydrogen atoms replaced by a substituent, e. g., halogeno, amino, acetyl, hydroxy, acetoxy, alkoxy, aryloxy, sulfamyl, alkyl, alkenyl, a —COOR group or groups in addition to the single —COOR group shown in the above formulas, etc. Specific examples of substituted divalent carbocyclic radicals are chlorophenylene, bromophenylene, chloronaphthylene, bromonaphthylene, bromo 2,5-toluylene, chlorocyclopentylene, chlorocyclopentenylene, hydroxyphenylene, ethoxyphenylene, acetophenylene, acetoxyphenylene, bromocyclopentylene, aminophenylene, phenoxyphenylene, sulfamylphenylene, methylphenylene (toluylene), allylphenylene, etc. Preferably Y is phenylene or methylphenylene.

Instead of the symmetrical triazines (s-triazines) represented by the above formulas, corresponding derivatives of the asymmetrical triazines or of the vicinal triazines may be used. Also, instead of the triazinyl monosulfides represented by the above formulas, the di- and trisulfides of the triazines (symmetrical, asymmetrical or vicinal) may be employed.

The triazine derivatives that are used in carrying the present invention into effect are more fully described and are specifically claimed in my copending application Serial No. 428,552, filed concurrently herewith and assigned to the same assignee as the present invention. As pointed out in this copending application, a suitable method of preparing the triazine derivatives employed in practicing the present invention comprises effecting reaction between a diamino [(—NHR)$_2$] mercapto symmetrical triazine (s-triazine) and a carboxy-, carboaliphaticoxy- (including carbocycloaliphaticoxy-) or carboaromaticoxy-carbocyclic-carbamyl or -thiocarbamyl-alkyl halide in the presence of a hydrohalide acceptor, e. g., an alkali-metal hydroxide. When a carboxy(—COOH)-carbocyclic-carbamyl or -thiocarbamyl-alkyl halide is used as a starting reactant and the proportions of reactants and reaction conditions are such that the hydrogen atom of the —COOH group of the carboxy-carbocyclic compound is replaced by the residue of the hydrohalide acceptor, e. g., by an alkali metal, the carboxy compound desired as a final product is obtained by treating this intermediate product with hydrochloric, hydrobromic, sulfuric or other suitable inorganic or organic acid in an amount just sufficient to form the desired carboxy derivative.

Specific examples of triazinyl carbocyclic-carbamyl sulfides and triazinyl carbocyclic-thiocarbamyl-alkyl sulfides that may be used in producing my new condensation products are listed below:

The diamino s-triazinyl ortho-, meta- and para-, carboxy-, carboalkoxy- and carboaryloxy-phenyl-carbamyl-methyl sulfides The diamino s-triazinyl ortho-, meta- and para-, carboxy-, carboalkoxy- and carboaryloxy-phenyl-thiocarbamyl-methyl sulfides The diamino s-triazinyl ortho-, meta- and para-, carboxy-, carboalkoxy- and carboaryloxy-tolyl-carbamylmethyl sulfides The di-(methylamino) s-triazinyl ortho-, meta- and para-, carboxy-, carboalkoxy- and carboaryloxy-phenyl-carbamyl-methyl sulfides The di-(anilino) s-triazinyl ortho-, meta- and para-, carboxy-, carboalkoxy- and carboaryloxy-tolyl-thiocarbamyl-methyl sulfides The diamino s-triazinyl alpha-(ortho-, meta- and para-, carboxy-, carboalkoxy- and carboaryloxy-phenyl-carbamyl-ethyl) sulfides The diamino s-triazinyl beta-(ortho-, meta- and para-, carboxy-, carboalkoxy- and carboaryloxy-phenyl-carbamyl-ethyl) sulfides The diamino s-triazinyl alpha-(ortho-, meta- and para-, carboxy-, carboalkoxy- and carboaryloxy-tolyl-thiocarbamyl-ethyl) sulfides The diamino s-triazinyl beta-(ortho-, meta- and para-, carboxy-, carboalkoxy- and carboaryloxy-tolyl-carbamyl-ethyl) sulfides The diamino s-triazinyl carbohaloalkoxy- and carbohaloaryloxy-carbocyclic-carbamyl-methyl sulfides The diamino s-triazinyl ortho-, meta- and para-, carbocycloaliphaticoxy- and carbohalocycloaliphaticoxy-phenyl-carbamyl-methyl sulfides The diamino s-triazinyl carboxy-, carboalkoxy- and carboaryloxy-halocarbocyclic-carbamyl-methyl sulfides The diamino s-triazinyl ortho-, meta- and para-, carboalkenyloxy and carbohaloalkenyloxy-tolyl-carbamyl-methyl sulfides The diamino s-triazinyl ortho-, meta- and para-carboethoxyphenyl-carbamyl-methyl sulfides The di-(methylamino) s-triazinyl ortho-, meta- and para - carbomethoxyphenyl - carbamyl-methyl sulfides The diamino s-triazinyl ortho-, meta- and para-carbomethoxyphenyl-carbamyl-methyl sulfides The diamino s-triazinyl ortho-, meta- and para-carboxyphenyl-carbamyl-methyl sulfides The diamino s-triazinyl ortho-, meta- and para-carbopropoxychlorophenyl - carbamyl - methyl sulfides The diamino s-triazinyl di-(carboethoxy)-phenyl-carbamyl-methyl sulfides The diamino s-triazinyl carbobutoxychlorophenyl-carbamyl-methyl sulfides The di-(cyclohexylamino) - s-triazinyl alpha-(ortho-, meta- and para-, carboxy-, carboalkoxy- and carboaryloxy-phenyl-carbamyl-ethyl) sulfides The di-(propylamino) s-triazinyl beta-(ortho-, meta- and para-, carboxy-, carboalkoxy- and carboaryloxy-tolyl-thiocarbamyl-ethyl) sulfides The diamino s-triazinyl ortho-, meta- and para-carbophenoxyphenyl-carbamyl-methyl sulfides The diamino s-triazinyl ortho-, meta- and para-carboethoxytolyl-carbamyl-methyl sulfides The diamino s-triazinyl ortho-, meta- and para-carbomethoxytolyl-carbamyl-methyl sulfides Diamino s-triazinyl carbobromophenoxyphenyl-carbamyl-methyl sulfide Diamino s-triazinyl carbochloroethoxychlorophenyl-carbamyl-methyl sulfide Diamino s-triazinyl carbomethoxyiodophenyl-carbamyl-methyl sulfide Diamino s-triazinyl ortho-carbophenoxyphenyl-carbamyl-(ethyl)-methyl sulfide Diamino s-triazinyl beta-(carbomethoxycycloheptyl-thiocarbamyl-ethyl) sulfide Diamino s-triazinyl alpha-(carbophenoxycyclohexenyl-carbamyl-ethyl) sulfide Diamino s-triazinyl beta-(carboethoxybromocycloheptyl-carbamyl-ethyl) sulfide 4-amino 6-fluoroanilino s-triazinyl-2 carbobutoxyphenyl-thiocarbamyl-methyl sulfide Di-(iodotoluido) s-triazinyl carbomethoxybromotolyl-carbamyl-methyl sulfide 4-bromoanilino 6-benzylamino s-triazinyl-2 carbopentoxycyclopentyl - carbamyl - (phenyl)-methyl sulfide 4-propylamino 6-amino s-triazinyl-2 beta-(ortho-carbobutoxytolyl-carbamyl-(tolyl)-methyl sulfide 4-(3'-butenylamino) 6-ethylamino s-triazinyl-2 alpha -(para-carbomethoxyphenyl - carbamyl-pentyl) sulfide 4-cyclopentenylamino 6-naphthylamino s-triazinyl-2 ortho-carboethoxyphenyl-(chloropropyl)-carbamyl-methyl sulfide 4-chlorocyclohexylamino 6-anilino s-triazinyl-2 carbobromophenoxycycloheptyl-(phenyl)-carbamyl-methyl sulfide Additional examples of triazine derivatives that may be employed in producing the new condensation products of the present invention are given in my above-identified copending application Serial No. 428,552.

The present invention is based on my discovery that new and valuable materials of particular utility in the plastics and coating arts can be produced by effecting reaction between ingredients comprising essentially an aldehyde, including polymeric aldehydes, hydroxyaldehydes and aldehyde-addition products, and certain triazinyl carbocyclic-carbamyl (or thiocarbamyl) alkyl sulfides, numerous examples of which have been given above and in the above-identified copending application.

Resins heretofore have been made by condensing an aldehyde with certain thioammeline ethers, but such known resins are not entirely satisfactory for use in many applications, for instance in the production of molding compounds having a high plastic flow during molding combined with a rapid cure to an insoluble, infusible state. Surprisingly it was found that the heat-curable resinous condensation products of this invention and molding compositions made therefrom show excellent flow characteristics during a short curing cycle. This is a property that is particularly desirable in a thermosetting resin and molding compound. The molded articles have a high dielectric strength and excellent resistance to arcing. They have a good surface finish and excellent resistance to water, being better than the ordinary urea-formaldehyde resins in this respect. The cured resins have a high resistance to heat and abrasion, and therefore are especially suitable for use where optimum heat- and abrasion-resistance are properties of primary importance.

In practicing my invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl, (e. g., triphenyl, tritolyl, etc.) amines, etc., or an aldehyde-reactable nitrogen-containing basic compound, for instance ammonia, primary amines (e. g, ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence of solvents or diluents, fillers, other natural or synthetic resinous bodies, or while admixed with other materials that also can react with the aldehydic reactant or with the triazine derivative, e. g., ketones, urea ($NH_2CONH_2$), thiourea, selenourea, iminourea (guanidine), substituted ureas, thioureas, selenoureas and iminoureas, numerous examples of which are given in various copending applications of mine, for instance in my copending application Serial No. 363,037, filed October 26, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the triazine derivatives constituting the primary components of the resins of the present invention, e. g., melamine, ammeline, ammelide, melem, melam, melon, numerous other examples being given in various copending applications of mine, for instance in application Serial No. 377,524, filed February 5, 1941, and in applications referred to in said copending application; phenol and substituted phenols, e. g., the cresols, the xylenols, the tertiary alkyl phenols and other phenols such as mentioned in my Patent No. 2,239,441; monohydric and polyhydric alcohols, e. g. butyl alcohol, amyl alcohol, isoamyl alcohol, ethylene glycol, glycerine, polyvinyl alcohol, etc.; amines, including aromatic amines, e. g., aniline, etc.; and the like.

The modifying reactants may be incorporated with the triazine derivative and the aldehyde by mixing all the reactants and effecting condensation therebetween or by various permutations of reactants as described, for example, in my copending application Serial No. 363,037 with particular reference to reactions involving a urea, an aldehyde and a semi-amide of oxalic acid. For instance, I may form a partial condensation product of ingredients comprising (1) urea or melamine or urea and melamine, (2) a triazine derivative of the kind described herein and in my copending application Serial No. 428,552, for example, a diamino s-triazinyl ortho-, meta- or para-carboalkoxyphenyl (e. g., carboethoxyphenyl) or -carboaryloxyphenyl (e. g., carbophenoxyphenyl) carbamylmethyl sulfide, a diamino s-triazinyl ortho-, meta- or para-carboalkoxytolyl-carbamyl-methyl sulfide, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc. Thereafter I may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

Depending upon the particular conditions of reaction and the particular reactants employed, the intermediate or partial condensation products vary from clear, colorless or colored, syrupy, water-soluble liquids to viscous, milky dispersions and gel-like masses of decreased solubility in ordinary solvents, e. g., ethyl alcohol, butyl alcohol, dioxane, Cellosolve, ethylene glycol, glycerine, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

Example 1

| | Parts |
|---|---|
| Diamino s-triazinyl para-carboethoxyphenyl-carbamyl-methyl sulfide (4,6-diamino s-triazinyl-2 para-carboethoxyphenyl-carbamyl-methyl sulfide; 2,6-diamino s-triazinyl-4 para-carboethoxyphenyl-carbamyl-methyl sulfide; 2,4-diamino s-triazinyl-6 para-carboethoxyphenyl-carbamyl-methyl sulfide) | 34.8 |
| Aqueous formaldehyde (approx. 37.1% HCHO) | 64.8 |
| Aqueous ammonia (approx. 28% NH₃) | 3.0 |
| Aqueous solution of sodium hydroxide (0.5 N) | 2.0 |
| Water | 60.0 |
| Chloroacetamide (monochloroacetamide) | 0.8 |

All of the above ingredients with the exception of the chloroacetamide were mixed and shaken for 20 hours at room temperature, after which the reaction mass was allowed to stand at room temperature for an additional 78 hours. The resulting liquid syrupy condensation product was mixed with 24.2 parts alpha cellulose in flock form and 0.1 part of a mold lubricant, specifically zinc stearate, to form a molding (moldable) composition. The wet molding compound was dried at room temperature until sufficient moisture had been removed so that the material could be molded satisfactorily. The above-stated amount of chloroacetamide was ground with the dried molding compound. A sample of the resulting product cured to an infusible state when molded under pressure at 140° C. This example illustrates that a condensation reaction between the triazine derivative and the aldehyde can be effected at room temperature.

Example 2

| | Parts |
|---|---|
| Diamino s-triazinyl para-carboethoxyphenyl-carbamyl-methyl sulfide | 17.9 |
| Urea | 15.0 |
| Aqueous formaldehyde (approx. 37.1% HCHO) | 48.6 |
| Aqueous ammonia (approx. 28% NH₃) | 3.0 |
| Aqueous solution of sodium hydroxide (0.5 N) | 1.6 |
| Water | 20.0 |
| Chloroacetamide | 0.4 |

All of the above components with the exception of the chloroacetamide were heated together under reflux at boiling temperature for 4 minutes. The resulting resinous syrup was mixed with 28.8 parts alpha cellulose, 0.1 part zinc stearate and the above-stated amount of chloroacetamide. The resulting composition was dried at room temperature as described under Example 1. A sample of the dried and ground compound was molded into the form of a disk, using a molding time of 5 minutes, a temperature of 140° C. and a pressure of 4,000 pounds per square inch. The molded disk was removed hot from the mold. It did not become distorted upon cooling to room temperature. The molded piece was well cured throughout and had a homogeneous and well-knit structure. It had good resistance to water, as indicated by the fact that when it was immersed in boiling water for 15 minutes followed by immersion in cold water for 5 minutes it absorbed only 3.3% by weight of water. The ordinary urea-formaldehyde resins yield molded articles which, when similarly tested, show a water-absorption value of about 5 to 7%. The molding compound of this example showed good plastic flow during molding, as indicated by the amount of flash on the molded piece.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, chloroacetone, glycine, sulfamic acid, citric diamide, phenacyl chloride, etc.). Other examples of active and latent curing catalysts and of curing reactants that may be employed to accelerate or to effect the curing of the thermosetting or potentially thermosetting resins of these and other examples are given in various copending applications of mine, for instance in copending applications Serial No. 346,962, filed July 23, 1940, and Serial No. 354,395, filed August 27, 1940, both of which applications are assigned to the same assignee as the present invention.

Example 3

| | Parts |
|---|---|
| Diamino s-triazinyl para-carboethoxyphenyl-carbamyl-methyl sulfide | 17.9 |
| Melamine | 31.5 |
| Aqueous formaldehyde (approx. 37.1% HCHO) | 78.0 |
| Aqueous ammonia (approx. 28% NH₃) | 2.0 |
| Aqueous solution of sodium hydroxide (0.5N) | 2.5 |
| Chloroacetamide | 0.3 |

All of the above ingredients with the exception of the chloroacetamide were heated together under reflux at boiling temperature for 6 minutes. The resulting resinous syrup was mixed with 44.1 parts alpha cellulose, 0.2 part zinc stearate and the above-stated amount of chloroacetamide. The wet molding compound thereby produced was dried at room temperature as described under Example 1. A sample of the dried and ground molding composition was molded for 7½ minutes at 140° C. under a pressure of 4,000 pounds per square inch. The molded piece had a well-knit, homogeneous and well-cured structure. It had excellent resistance to water, as shown by the fact that it absorbed only 0.44% by weight of water when tested for its water-resistance characteristics as described under Example 2. The molding compound had good plasticity during molding.

Example 4

| | Parts |
|---|---|
| Diamino s-triazinyl para-carboethoxy phenyl-carbamyl-methyl sulfide | 17.9 |
| Dimethylol urea (commercial grade containing approx. 11% by weight of water) | 54.0 |
| Aqueous ammonia (approx. 28% NH₃) | 3.5 |
| Aqueous solution of sodium hydroxide (0.5 N) | 2.5 |
| Water | 78.7 |
| Chloroacetamide | 0.4 |

All of the above ingredients were heated together under reflux at boiling temperature for 3 minutes, at the end of which period of time the reaction mass began to separate into two layers. A molding compound was made from the resulting resinous syrup by mixing therewith 52.3 parts alpha cellulose and 0.3 part zinc stearate. The wet compound was dried at room temperature as described under Example 1. A well-cured molded piece having a well-knit and homogeneous structure was produced by molding a sample of the dried molding compound for 5 minutes at 140° C. under a pressure of 5,600 pounds per square inch. The molded article was removed hot from the mold and did not warp upon cooling to room temperature. The molded piece had a water-absorption value of only 2.4%, as determined by the method described under Example 2. The molding compound had very good plasticity during molding.

Example 5

| | Parts |
|---|---|
| Diamino s-triazinyl para-carboethoxy-phenyl-carbamyl-methyl sulfide | 17.9 |
| Aminotriazole, specifically 1-carbamyl guanazole | 14.2 |
| Aqueous formaldehyde (approx. 37.1% HCHO) | 40.5 |
| Aqueous ammonia (approx. 28% NH₃) | 1.5 |
| Aqueous solution of sodium hydroxide (0.5 N) | 1.0 |
| Chloroacetamide | 0.3 |

All of the above components with the exception of the aminotriazole and the chloroacetamide were heated together under reflux at boiling temperature for 3 minutes. At the end of this period of time the aminothiazole was added and refluxing was continued for an additional 2 minutes. The chloroacetamide was now added and the resulting resinous syrup immediately was mixed with 25.1 parts alpha cellulose and 0.1 part zinc stearate. The wet molding compound thereby produced was dried at room temperature as described under Example 1. A sample of the dried and ground molding compound was molded into the form of a disk, using a molding time of 5 minutes, a temperature of 140° C. and a pressure of 4,500 pounds per square inch. The molded disk was well knit and had a homogenous and well-cured structure. It had good resistance to water, as indicated by the fact that it absorbed only 3.33% by weight of water when tested for its water-resistance characteristics as described under Example 2. The molding compound had excellent plastic flow during molding.

Example 6

| | Parts |
|---|---|
| Diamino s-triazinyl para-carboethoxy-phenyl-carbamyl-methyl sulfide | 17.4 |
| Furfural | 48.0 |
| Aqueous ammonia (approx. 28% NH₃) | 1.0 |
| Aqueous solution of sodium hydroxide 0.5 N) | 1.0 | were heated together under reflux at boiling temperature for 15 minutes. The resulting resinous syrup cured to a semi-infusible state when a small sample of it was heated on a 140° C. hotplate. The addition of chloroacetamide, glycine, aminoacetamide hydrochloride, phenacyl chloride and other curing agents such as mentioned under Example 2 accelerated the conversion of the resin to an insoluble and infusible state when the individual samples containing the curing agent were heated on a 140° C. hotplate. The cured resin possessed excellent adhesive and cohesive characteristics. It could be removed from the hotplate in the form of a flexible film.

Example 7

| | Parts |
|---|---|
| Diamino s-triazinyl para-carboethoxy-phenyl-carbamyl-methyl sulfide | 17.4 |
| Acrolein | 28.0 |
| Aqueous solution of sodium hydroxide (0.5 N) | 1.0 |
| Water | 20.0 | were heated together under reflux at boiling temperature for 3 minutes. At the end of this period of time a thick, syrupy resin separated from the remainder of the liquid. Upon cooling to room temperature this liquid resin, which was of molasses-like consistency, formed a putty-like solid. When a sample of this resin was heated on a 140° C. hotplate, the resin first melted and then set to a semi-infusible state. During the setting process the resin could be drawn into the form of fibers several inches in length. These fibers became brittle upon cooling to room temperature. When the resin was worked into the form of a thin film on the hotplate, it formed a transparent sheet. The addition of chloroacetamide, phthalic monoamide, glycine, aminoacetamide hydrochloride and other curing agents such as mentioned under Example 2, followed by heating on a 140° C. hotplate, caused the resin to convert to an infusible state. The resinous composition of this example is suitable for use in fiber-forming, coating, impregnating and molding compositions.

Example 8

| | Parts |
|---|---|
| Diamino s-triazinyl para-carboethoxyphenyl-carbamyl-methyl sulfide | 17.4 |
| Butyl alcohol | 37.0 |
| Aqueous formaldehyde (approx. 37.1% HCHO) | 40.5 |
| Aqueous ammonia (approx. 28% NH₃) | 1.0 |
| Aqueous solution of sodium hydroxide (0.5 N) | 1.0 | were heated together under reflux at boiling temperature for 15 minutes. The resulting syrupy condensation product was dehydrated. The dehydrated syrupy resin was soluble in ethyl alcohol, benzyl alcohol, dioxane, ethylene glycol, Cellosolve and other organic solvents. A sample of the dehydrated syrup was applied to a glass plate and the coated plate then was baked for several hours at 70° C. A hard, transparent, water-white, water-resistant, smooth and tightly adherent film was formed on the plate.

Example 9

| | Parts |
|---|---|
| Diamino s-triazinyl para-carboethoxyphenyl-carbamyl-methyl sulfide | 17.4 |
| Acetamide | 3.0 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 | were heated together under reflux at boiling temperature for 30 minutes. The addition of curing agents such as mentioned under Example 2 to the resinous syrup, followed by heating on a 140° C. hotplate for 5 minutes, did not effect a conversion of the resin to an infusible state. A sample of the resinous syrup was applied to a glass plate and the coated plate then was baked at 70° C. for about 16 hours. A smooth, water-white, transparent and tightly adherent film was formed on the plate. A somewhat harder film was produced when a small amount of hydrochloric acid was incorporated into the resinous syrup prior to applying the same to the glass plate. The resinous composition of this example may be used as a modifier of other synthetic resins. For instance, it may be used as a modifier of rapidly curing aminoplasts to control their flow or plasticity characteristics. It also may be used in coating compositions to provide materials of better flow properties.

Example 10

| | Parts |
|---|---|
| Diamino s-triazinyl para-carboethoxyphenyl-carbamyl-methyl sulfide | 17.4 |
| Diethyl malonate | 8.0 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 | were heated together under reflux at boiling temperature for 15 minutes. The resulting resinous syrup had properties very similar to the product of the previous example. The resin was thermoplastic and did not cure to an infusible state when curing agents such as mentioned under Example 2 were incorporated therein, followed by heating on a 140° C. hotplate for 5 minutes. A sample of the resinous syrup to which a small amount of hydrochloric acid had been added was applied to a glass plate and the coated plate was baked for several hours at 70° C. A smooth clear, hard, transparent, water-resistant and tightly adherent film was formed on the plate. The resinous composition of this example is especially suitable for use as a plasticizer of molding compositions and in the preparation of coating compositions.

Example 11

| | Parts |
|---|---|
| Diamino s-triazinyl para-carboethoxyphenyl-carbamyl-methyl sulfide | 17.4 |
| Glycerine | 4.6 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 | were heated together under reflux at boiling temperature for 15 minutes. The resulting resinous condensation product was dehydrated. The dehydrated syrup was soluble in ethyl alcohol, benzyl alcohol, butyl alcohol, dioxane, ethylene glycol, Cellosolve and other organic solvents. A sample of the dehydrated syrup containing a small amount of hydrochloric acid was applied to a glass plate and the coated plate was baked for several hours at 70° C. A hard, transparent, water-white, smooth and tightly adherent film was formed on the plate. The resin of this example is particularly suitable for use as a plasticizer in molding compounds and coating compositions where products of improved flow characteristics are desired. For example, it may be used as a modifier of varnishes of the aminoplast and alkyd-resin types.

Example 12

| | Parts |
|---|---|
| Diamino s-triazinyl para-carboethoxyphenyl-carbamyl-methyl sulfide | 17.4 |
| Polyvinyl alcohol | 2.2 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 |
| Water | 20.0 | were heated together under reflux at boiling temperature for 10 minutes. When a sample of the resulting resinous syrup was heated on a 140° C. hotplate, it set to a semi-infusible mass having a rubber-like consistency. The addition of glycine, chloroacetamide and other curing agents such as mentioned under Example 2 to the resinous syrup, followed by heating on a 140° C. hotplate, caused the resin to cure rapidly to an insoluble and infusible state. A sample of the resinous syrup was applied to a glass plate and the coated plate then was baked for several hours at 70° C. A hard, transparent, water-white, smooth, water-resistant and tightly adherent film was formed on the plate. The resinous material of this example may be used in the preparation of various molding and coating compositions.

It will be understood, of course, by those skilled in the art that the reaction between the aldehyde and the triazine derivative may be effected at temperatures ranging, for example, from room temperature to the fusion or boiling temperatures of the mixed reactants or of solution of the mixed reactants, the reaction proceeding more slowly at normal temperatures than at elevated temperatures in accordance with the general law of chemical reactions. Thus, instead of effecting reaction between the ingredients of Examples 2 to 12, inclusive, at boiling temperature under reflux, the reaction between the components may be carried out at lower temperatures, for example at temperatures ranging from room temperature to a temperature near the boiling temperature using longer reaction periods and, in some cases, stronger catalysts and higher catalyst concentrations. Likewise, the components of Example 1 may be caused to react at temperatures above room temperature, for example at boiling temperature under reflux using a shorter reaction period, for instance from 10 to 30 minutes.

It also will be understood by those skilled in the art that my invention is not limited to condensation products obtained by reaction of ingredients comprising an aldehyde and the specific diamino s-triazinyl carboalkoxycarbocyclic-carbamyl-alkyl sulfide named in the above illustrative examples. Thus, instead of diamino s-triazinyl para-carboethoxyphenyl-carbamylmethyl sulfide, I may use, for example, the corresponding ortho or meta derivatives, the diamino s-triazinyl carboalkoxytolyl-carbamyl-methyl sulfides, the diamino s-triazinyl carboaryloxycarbocyclic (e. g., carbophenoxyphenyl) carbamyl methyl sulfides, the diamino s-triazinyl carboxycarbocyclic (e. g. carboxyphenyl) carbamylmethyl sulfides, or any other organic sulfide (or mixture thereof) of the kind with which this invention is concerned, numerous examples of which compounds have been given hereinbefore and in my copending application Serial No. 428,552.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, methacrolein, crotonaldehyde, benzaldehyde, furfural, hydroxyaldehydes (e. g., glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and polymethylol derivatives of urea, thiourea, selenourea and iminourea, substituted ureas, selenoureas, thioureas and iminoureas (numerous examples of which are given in my copending application Serial No. 377,524), mono- and poly-(N-carbinol) derivatives of amides of poly-carboxylic acids, e. g., maleic, itaconic, fumaric, adipic, malonic, succinic, citric, phthalic, etc., mono- and poly-(N-carbinol) derivatives of the aminodiazines, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the triazine derivative may be varied over a wide range depending upon the particular properties desired in the final product. Ordinarily these reactants are employed in an amount corresponding to at least one mol of the aldehyde, specifically formaldehyde, for each mol of the triazine derivative. Thus, I may use, for example, from 1 to 7 or 8 mols of an aldehyde for each mol of triazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance, from 2 or 3 up to 15 or 20 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acrylamide, benzamide, toluene sulfonamides, benzene sulfonamides, adipic diamide, phthalamide, etc.; amines such as ethylene diamine, phenylene diamine, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in my copending applications Serial No. 289,273, filed August 9, 1939, now Patent No. 2,281,559, issued May 5, 1942, and Serial No. 400,649, filed July 1, 1941, now Patent No. 2,294,873, issued September 1, 1942; and others.

The modifying bodies also may take the form of high molecular weight bodies with or without resinous characteristics, for example hydrolyzed wood products, formalized cellulose derivatives, lignin, protein-aldehyde condensation products, condensation products of an aldehyde with an aldehyde-reactable diazine, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Dyes, pigments, plasticizers, mold lubricants, opacifiers, curing agents and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be employed in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and a compound corresponding to the general formula

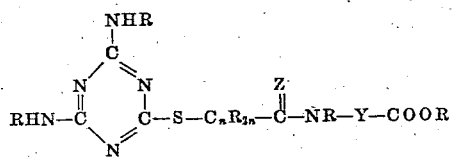

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

2. A composition as in claim 1 wherein the aldehyde is formaldehyde.

3. A composition as in claim 1 wherein the reaction product is an alkaline-catalyzed reaction product of the stated components.

4. A composition comprising the condensation product of a plurality of reactants including an aldehyde and a compound corresponding to the general formula

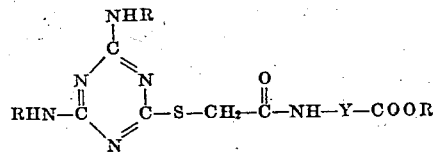

where Y represents a divalent carbocyclic radical, and R represents a member of the class consisting of hydrogen and monovalent hydrocarbon and halo-hydrocarbon radicals.

5. A composition comprising the condensation product of ingredients comprising an aldehyde and a diamino s-triazinyl carboaliphaticoxycarbocyclic-carbamyl-methyl sulfide.

6. A composition comprising the condensation product of ingredients comprising an aldehyde and a diamino s-triazinyl carboaromaticoxycarbocyclic-carbamyl-methyl sulfide.

7. A resinous composition comprising the product of reaction of ingredients comprising an aldehyde and a diamino s-triazinyl carboalkoxyaryl-carbamyl-methyl sulfide.

8. A heat-curable resinous composition comprising a heat-convertible condensation product of ingredients comprising formaldehyde and a diamino s-triazinyl carboalkoxyphenyl-carbamyl-methyl sulfide.

9. A product comprising the heat-cured resinous composition of claim 8.

10. A composition comprising the resinous product of reaction of ingredients comprisng an aldehyde and a diamino s-triazinyl carboethoxyphenyl-carbamyl-methyl sulfide.

11. A resinous composition comprising the product of reaction of a mixture containing formaldehyde and diamino s-triazinyl para-carboethoxyphenyl-carbamyl-methyl sulfide.

12. A composition containing as an essential component the product of reaction of ingredients comprising an aldehyde and a diamino s-triazinyl carboalkoxytolyl-carbamyl-methyl sulfide.

13. A composition comprising the product of reaction of ingredients comprising a urea, an aldehyde and a compound corresponding to the general formula

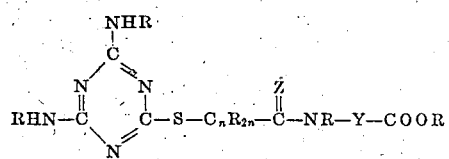

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

14. A composition as in claim 13 wherein the urea component is the compound corresponding to the formula $NH_2CONH_2$ and the aldehyde is formaldehyde.

15. A heat-curable composition comprising the heat-convertible resinous reaction product of (1) a partial condensation product of ingredients comprising formaldehyde and a diamino s-triazinyl carboalkoxycarbocyclic-carbamyl-methyl sulfide, and (2) a curing reactant.

16. A composition as in claim 15 wherein the curing reactant is a chlorinated acetamide.

17. A composition comprising the product of reaction of ingredients comprising urea, formaldehyde and a diamino s-triazinyl carboxyaryl-carbamyl-methyl sulfide.

18. A composition containing the resinous product of reaction of ingredients comprising a methylol urea and a diamino s-triazinyl carboalkoxyaryl-carbamyl-methyl sulfide.

19. A composition comprising the condensation product of a plurality of reactants including melamine, formaldehyde and a diamino s-triazinyl carboalkoxyaryl-carbamyl-methyl sulfide.

20. The method of preparing new condensation products which comprises effecting reaction between ingredients comprising an aldehyde and a compound corresponding to the general formula

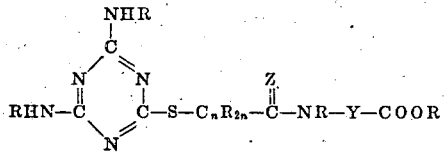

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

GAETANO F. D'ALELIO.

CERTIFICATE OF CORRECTION.

Patent No. 2,312,704.  March 2, 1943.

GAETANO F. D'ALELIO.

It is hereby certified that error appears in the printed specification of the above numbered patent requiring correction as follows: Page 1, second column, line 4, strike out "chloroethyl, bromoethyl, bromoethyl, chloro-"; line 39, for "naphthalene" read --naphthylene--; page 2, first column, line 57, for "tolyl-carbamylmethyl" read --tolyl-carbamyl-methyl--; and second column, line 16, for "carbomethoxyphenyl" read --carboethoxyphenyl--; page 3, second column, line 40, after "e. g." insert a comma; page 5, second column, line 3, for "aminothiazole" read --aminotriazole--; line 15-16, for "homogenous" read --homogeneous--; line 29, for "0.5 N)" read --(0.5 N)--; page 6, second column, line 1, after "smooth" insert a comma; line 70, for "solution" read --solutions--; page 7, first column, line 26-27, for "carbamyl methyl" read --carbamyl-methyl--; line 28, after "e. g." insert a comma; line 54, for "areas" read --ureas--; page 8, second column, line 4, claim 10, for "comprisng" read --comprising--; and that the said Letters Patent should be read with this correction therein that the same may conform to the record of the case in the Patent Office.

Signed and sealed this 18th day of May, A. D. 1943.

(Seal)

Henry Van Arsdale,
Acting Commissioner of Patents.